United States Patent [19]

Hayashi et al.

[11] Patent Number: 5,086,158

[45] Date of Patent: Feb. 4, 1992

[54] POLYESTER RESIN EXHIBITING ANISOTROPY IN A MOLTEN STATE AND RESIN COMPOSITION

[75] Inventors: Noriyuki Hayashi; Yukihiko Kageyama; Kenji Hijikata, all of Shizuoka, Japan

[73] Assignee: Polyplastics Co., Ltd., Osaka, Japan

[21] Appl. No.: 604,240

[22] Filed: Oct. 29, 1990

[30] Foreign Application Priority Data

Nov. 1, 1989 [JP] Japan .................. 1-285631

[51] Int. Cl.$^5$ .................. C08G 63/02; C08G 63/00
[52] U.S. Cl. .................. 528/193; 528/176; 528/190
[58] Field of Search .................. 528/176, 190, 193

[56] References Cited

U.S. PATENT DOCUMENTS

| | | | |
|---|---|---|---|
| 3,778,410 | 12/1973 | Kuhfuss et al. | 528/176 |
| 3,975,487 | 8/1976 | Cottis et al. | 528/193 |
| 4,067,852 | 1/1978 | Calundann | 528/190 |
| 4,161,470 | 7/1979 | Calundann | 528/190 |
| 4,219,461 | 8/1980 | Calundann | 528/190 |
| 4,256,624 | 3/1981 | Calundann | 524/599 |
| 4,473,682 | 9/1984 | Calundann et al. | 524/605 |
| 4,835,243 | 5/1989 | Eckhardt et al. | 528/193 |
| 4,891,418 | 1/1990 | Hara et al. | 528/195 |
| 4,937,310 | 6/1990 | Hayashi et al. | 528/193 |

*Primary Examiner*—Harold D. Anderson
*Assistant Examiner*—T. Mosley
*Attorney, Agent, or Firm*—Burns, Doane, Swecker & Mathis

[57] ABSTRACT

A novel polyester is provided which forms an anisotropic melt phase in combination with good heat resistance and melt-processability. The polyester is formed from a combination of appropriate concentrations of four essential constituent units (as described). In a particularly preferred embodiment the polyester is derived from p-acetoxybenzoic acid, 4,4'-diacetoxydiphenyl, 2,2-propylidenebis(1,4-phenylene), and terephthalic acid. The resulting polyester is well suited to injection molding to form superior three-dimensional articles, fibers and films.

20 Claims, No Drawings

POLYESTER RESIN EXHIBITING ANISOTROPY IN A MOLTEN STATE AND RESIN COMPOSITION

FIELD OF INDUSTRIAL APPLICATION

The present invention relates to a polyester resin exhibiting optical anisotropy in a molten state which is excellent in the retention of shape and physical properties at high temperatures (hereinafter referred to as the "heat resistance") and processability, and a composition of the same.

PRIOR ART

Various proposals have been made with respect to polymers exhibiting optical anisotropy in a molten state (i.e., liquid-crystal polymers) as thermoplastic resins excellent in both heat resistance and processability. Representatively, they are disclosed in, for example, Japanese Patent Laid-Open Nos. 72393/1974 (①), 43223/1975 (②) and 77691/1979 (③). All of these liquid-crystal polymers each have a skeleton containing a rigid segment introduced thereinto, so that they exhibit liquid crystallinity, high strengths and excellent heat resistance and are easily processable by virtue of their excellent melt flowability.

However, the heat resistance and processability of the polyester resin must be further improved in the following respects in order to apply the resin to a widened industrial field.

That is, from the standpoint of processability, a polyester resin must have a suitable flow-initiating temperature, satisfactory melt flowability and such excellent heat stability as not to cause decomposition gas evolution and discoloration in processing.

Among these requirements, those with respect to flow-initiating temperature and melt flowability can be satisfied by utilizing the liquid crystallinity. However, the problem with respect to decomposition gas evolution and discoloration in processing is difficult to solve by the use of a conventional stabilizer for thermoplastic polymers, when the processing is carried out at a temperature exceeding 300° C. Accordingly, it is impossible to enhance the processing temperature unlimitedly.

Meanwhile, the molding temperature of a thermoplastic resin, particularly polyester, is preferably about 370° C. or below. If the molding temperature thereof exceeds 370° C., the resin itself will undergo significant thermal degradation, so that no constant strengths of the resin can be guaranteed under such a thermal history, and such a high molding temperature will deviate from the service temperature of a conventional molding machine.

On the other hand, from the standpoint of heat resistance, a polyester resin must have such high stability as to retain its shape and mechanical strengths even at high temperatures. Particularly, the resin to be used in an electrical or electronic field must sufficiently retain its shape and physical properties at 260° C. or above, in order to withstand being subjected to soldering, a treatment widely employed in such a field.

As described above, a polyester resin must be improved so as to be satisfactory in both heat resistance and processability. However, the two properties are contradictory to each other for conventional thermoplastic resins, so that it is extremely difficult to enhance the reliability of the deformation resistance and mechanical properties at high temperatures with a lowering in the melting point or flow-initiating temperature which serves as an indication of the processability.

In this connection, the liquid-crystal polymer ① previously proposed necessitates a molding temperature exceeding 400° C. and the polymer is so poor in stability at such a high temperature that a large amount of a decomposition gas is generated during the molding thereof. Although the polymers ② and ③ satisfy the requirement that the molding temperature must not exceed about 370° C., the polymer ② is too poor in high-temperature reliability to retain its shape at a temperature of 260° C. or above which is necessary for soldering, while the polymer ③ is unsatisfactory in the reliability of the strength retention at high temperatures.

SUMMARY OF THE INVENTION

In view of the above problem, the inventors of the present invention have intensively studied to obtain a thermoplastic resin which is satisfactory in both of the two properties, i.e., heat resistance and processability, and is excellent in the retention of mechanical properties even in a severe high-temperature environment and have found that a polyester comprising specific constituent units can satisfy the contradictory requirements with a good balance. The present invention has been accomplished on the basis of this finding.

Namely, the present invention relates to a polyester resin exhibiting anisotropy in a molten state which comprises constituent units represented by the following formulas (I) to (IV) as essential units with the proviso that the proportions of the units (I), (II), (III) and (IV) to the total amount of the whole constituent units are 50 to 85, 5 to 30, 0.1 to 5 and 5 to 30 mole %, respectively where:

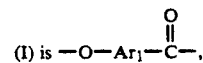

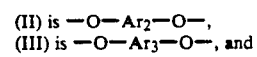

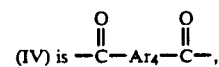

wherein $Ar_1$ is one or more members selected from among phenylene and naphthalene groups; $Ar_2$ is one or more members selected from among phenylene and biphenylene groups; $Ar_3$ is one or more members selected from among the groups represented by the general formula:

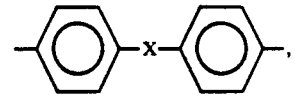

wherein X is a group represented by the general formula:

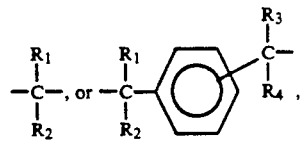

wherein $R_1$ to $R_4$ are each a $C_{1-20}$ alkyl group, a phenyl group or a group derived therefrom; and $Ar_4$ is one or more members selected from among phenylene and naphthalene groups.

According to the present invention, the proportion of the unit (I) to the whole constituent units is 50 to 85 mole %. If the proportion is less than 50 mole %, no excellent heat resistance can be attained, while if it exceeds 85 mole %, insoluble and inmeltable matter will be generated in the polymer to lower the homogeneity thereof. In the formula (I), $Ar_1$ is one or more members selected from among phenylene and naphthalene groups, preferably 1,4-phenylene and/or 2,6-naphthalene, most preferably 1,4-phenylene. Particular examples of the compound for forming the constituent unit (I) include hydroxybenzoic acid, hydroxynaphthoic acid and ester-forming derivatives thereof. The ester-forming derivative includes acetoxy derivatives of the above compounds, methyl or phenyl esters thereof and acid chlorides thereof.

The proportion of the unit (II) to the whole constituent units is 5 to 30 mole %. In the formula (II), $Ar_2$ is one or more members selected from among phenylene and biphenylene groups, preferably 1,4-phenylene and/or 4,4'-biphenylene, most preferably 4,4'-biphenylene. Particular examples of the compound for forming the constituent unit (II) include hydroquinone, 4,4'-dihydroxybiphenyl and ester-forming derivatives thereof. The ester-forming derivatives are generally acetoxy derivatives thereof.

The amount of the unit (III) used is 0.1 to 5 mole % based on the total constituent units. If the amount exceeds 5 mole %, the resulting polymer will exhibit remarkably lowered heat resistance, while if it is less than 0.1 mole %, no effect can be attained. The use of a constituent unit represented by the formula (III) even in a very small amount can remarkably lower the softening point of the polymer. Unexpectedly, the heat resistance of the polymer can be retained in spite of the lowering in the softening point. By virtue of the low level of the unit (III) content, the damage to the rigidity of the polymer due to the unit (III) can be minimized in a temperature range capable of molding the polymer, so that the heat resistance is favorably retained.

$Ar_3$ is represented by the following general formula:

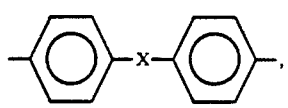

wherein X is

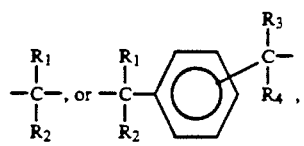

wherein $R_1$ to $R_4$ are each an alkyl group containing 1 to 20, preferably 1 to 5, most preferably 1 to 3 carbon atoms. The phenyl group or group derived therefrom is represented by the formula:

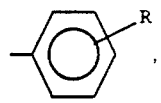

wherein R is a hydrogen atom or an alkyl group containing 1 to 15, preferably 1 to 3 carbon atoms.

In order to improve the processability without damaging the resistance to soldering heat, it is preferable that $Ar_3$ be

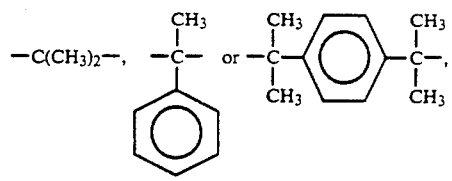

among which $-C(CH_3)_2-$ is particularly preferred from the economic viewpoint.

Particular examples of the compound for forming the unit (III) include 2,2-bis(4-hydroxyphenyl)-propane, 4,4'-(1-phenylethylidene)bisphenol, 4,4'-[1,4-phenylenebis(1-methylethylidene)]bisphenol and ester-forming derivatives thereof. The ester-forming derivatives are generally acetoxy derivatives thereof.

The proportion of the unit (IV) to the whole constituent units is 5 to 30 mole %, which corresponds to that of the unit (II). $Ar_4$ is one or more members selected from among phenylene and naphthalene groups, preferably 1,4-phenylene and/or 2,6-naphthalene, most preferably 1,4-phenylene. Particular examples of the compound for forming the unit (IV) include terephthalic acid, naphthalene-dicarboxylic acid and ester-forming derivatives thereof. The ester-forming derivatives include methyl and phenyl esters of the above compounds and acid chlorides thereof.

Particularly, an example of the optimum combination is a case wherein $Ar_1$ is 1,4-phenylene, $Ar_2$ is 4,4'-biphenylene, $Ar_4$ is 1,4-phenylene and the proportions of the units (I), (II), (III) and (IV) to the total constituent units are 50 to 85, 5 to 30, 0.1 to 5 and 5 to 30 mole %, respectively.

When the polyester resin is an ordinary molding resin, the molar ratio of ((II)+(III)) to (IV) is preferably 0.95 to 1.05, while when it is a low-viscosity resin, this ratio is preferably 0.75 to 1.25.

The polymer of the present invention can be prepared from the compounds as described above by direct polymerization or transesterification. The polymerization is generally carried out by melt polymerization, slurry polymerization or the like.

Various catalysts can be used in the polymerization and representative examples thereof include dialkyltin oxides, diaryltin oxides, titanium dioxides, alkoxytitanium silicates, titanium alcoholates, salts of alkali or alkaline earth metals with a carboxylic acid and Lewis acids such as $BF_3$.

The amount of the catalyst used is about 0.001 to 1% by weight, preferably about 0.01 to 0.2% by weight, based on the total amount of the monomers used.

The polymer thus prepared may be subjected to solid-phase polymerization by heating under a reduced pressure or in an inert gas to enhance the molecular weight thereof.

The requirement that the polymer must be a liquid-crystal one exhibiting optical anisotropy in a molten state is essential for the polymer to have both excellent heat resistance and excellent processability. The presence of an anisotropic molten phase can be ascertained by a conventional test with polarized light using crossed nicols. Precisely, a molten sample put on a Leitz hot stage is observed in a nitrogen atmosphere by the use of a Leitz polarization microscope (40×magnification). The above polymer is optically anisotropic, so that the light can be transmitted through the crossed nicols between which the polymer is inserted. If the sample is optically anisotropic, polarized light can be transmitted even when the sample is in a static molten state.

The factors which serve as an indication of the processability according to the present invention include liquid crystallinity and melting point (i.e., the temperature at which the liquid crystallinity is developed). Whether a polymer exhibits liquid crystallinity or not has a great influence on the melt flowability of the polymer. Therefore, the polyester of the present invention must also exhibit liquid crystallinity in a molten state.

A nematic liquid-crystal polymer exhibits a remarkable viscosity drop at a temperature above its melting point, so that whether a polymer exhibits liquid crystallinity above its melting point or not generally serves as an indication of the processability of the polymer. It is preferable in consideration of the thermal degradation of a polymer in melt processing and the heating capacity of a molding machine that the melting point (liquid crystallinity developing temperature) be about 370° C. or below, though it is preferable from the standpoint of heat resistance that the melting point be as high as possible. Further, it is preferable that the melt viscosity of the resin at a temperature higher than its melting point by at least 10° C. under a shear stress of 100 sec$^{-1}$ be $1 \times 10^6$ P or below, most preferably $10^4$ P or below. Such a melt viscosity can be generally attained when the resin exhibits liquid crystallinity.

The indication of the heat resistance of the resin according to the present invention includes high-temperature rigidity, retention of such rigidity and retention of mechanical strength after the thermal history in molding. Further, in order to apply the resin to an electrical field, the resin must have such heat resistance as to withstand soldering heat.

It is preferable that the high-temperature torsional rigidity as determined with a rheometer at 260° C., which serves as an indication of the deformation resistance in soldering, be $1 \times 10^3$ or above. With respect to the rigidity retention, it is necessary from the viewpoint of the reliability of the resin as a material to avoid a significant drop in the rigidity in a temperature range of 260° to 280° C. It is unfavorable that the rigidity retention is lower than at least 50%. Further, it is also necessary to avoid a significant rigidity drop due to the thermal degradation of the polymer in a molten state. That is, if the rigidity retention of the polymer after the residence in a molding machine in a molten state for 30 minutes is less than 80%, the reliability of the polymer as a molding material will be lost.

According to the present invention, various fibrous, powdery, granular and flaky inorganic and organic fillers can be added to the polyester of the present invention depending upon the object of the use.

Examples of the fibrous filler include inorganic fibrous materials such as glass fiber, asbestos fiber, silica fiber, silica/alumina fiber, alumina fiber, zirconia fiber, boron nitride fiber, silicon nitride fiber, boron fiber, and potassium titanate fiber, and fibrous materials of metal such as stainless steel, aluminum, titanium, copper or brass, among which glass fiber is particularly representative. High-melting organic fibrous materials such as polyamide, fluororesin, polyester resin and acrylic resin may also be used.

Examples of the powdery or granular filler include carbon black, graphite, silicates such as silica, quartz powder, glass beads, milled glass fiber, glass balloons, glass powder, calcium silicate, aluminum silicate, kaolin, talc, clay, diatomaceous earth and wollastonite; metal oxides such as iron oxides, titanium oxide, zinc oxide, antimony trioxide and alumina; carbonates such as calcium carbonate and magnesium carbonate; sulfates such as calcium sulfate and barium sulfate; ferrite, silicon carbide, silicon nitride, boron nitride and various powdered metals.

Examples of the flaky filler include mica, glass flake and various metal foils.

Examples of the organic filler include heat-resistant high-strength synthetic fibers such as aromatic polyester fibers, liquid-crystal polymer fibers, aromatic polyamide and polyimide fibers.

These inorganic or organic fillers may be used alone or as a mixture of two or more of them. The simultaneous use of a fibrous filler and a granular or flaky filler is particularly favorable for obtaining a composition excellent both in mechanical strength, and in dimensional stability and electrical properties. The amount of the inorganic filler added is at most 95% by weight, preferably 1 to 80% by weight, based on the total amount of the composition.

If necessary, the above filler may be favorably used together with a sizing agent or a surface treatment.

The polyester resin composition according to the present invention may auxiliarily contain another thermoplastic resin, so long as the object of the present invention is not hindered.

Examples of the thermoplastic resin to be auxiliarily used include polyolefins such as polyethylene and polypropylene; aromatic polyesters prepared from aromatic dicarboxylic acid and diol or hydroxy carboxylic acid such as polyethylene terephthalate and polybutylene terephthalate; polyacetals (homopolymer and copolymer), polystyrene, polyvinyl chloride, polyamide, polycarbonate, ABS, polyphenylene oxide, polyphenylene sulfide and fluororesins. These thermoplastic resins may be also used as a mixture of two or more of them.

Effect of the Invention

The aromatic polyester of the present invention characterized by comprising specified constituent units and exhibiting optical anisotropy in a molten state and the composition containing it have excellent performance and exhibit excellent flow behavior at a processing temperature of 370° C. or below, so that they can be molded into various three-dimensional parts, fibers or films by injection, extrusion or compression molding. Particularly, the flow behavior is suitable for injection molding. Further, they are so excellent in heat resistance that they can not only reliably retain their mechanical strength at elevated temperatures but also well retain their shape and physical properties even during soldering. Thus, they are highly useful in various fields necessitating heat resistance, particularly parts necessitating soldering.

EXAMPLE

The present invention will now be described by referring to the following Examples, though the present invention is not limited by them.

The methods of measurement employed in the present invention will first be described.

1) Determination of liquid crystallinity

The liquid crystallinity of the obtained resin was ascertained by the use of a Leitz polarization microscope. Namely, a molten sample put on a Leitz hot stage was observed in a nitrogen atmosphere (40×magnification). When light was transmitted through the crossed nicols between which the sample was inserted to exhibit a unique pattern, the sample was judged to be a liquid-crystal one.

2) Melting point (flow-initiating temperature)

A pressed sheet made of the resin having a thickness of 1 mm was examined according to the Vicat method to determine the temperature at which a needle having predetermined dimensions penetrated the sheet under a predetermined load to reach a depth of 0.1 mm. This temperature was regarded as the flow-initiating temperature (melting point) of the resin.

3) Processability

A sample wherein a resin exhibited liquid crystallinity at about 370° C. or below and a viscosity of $10^4$ P or below as determined at a temperature higher than the melting point thereof by 10° C. under a shear stress of 100 $sec^{-1}$ with a capillograph mfd. by Toyo Seiki was shown by "○", while a sample other than the above one was shown by "X".

4) Determination of resistance to soldering heat

A test piece prepared by cutting a pressed sheet having a thickness of 1 mm was dipped in a molten solder bath at 280° C. for 30 seconds to observe the surface of the test piece. A sample wherein an abnormal phenomenon such as blister, buckling, crack or deformation was observed was shown by "X", while a sample wherein no abnormal phenomenon was observed was shown by "○".

5) Determination of torsional rigidity

A test piece for tensile testing prepared by cutting a pressed sheet having a thickness of 1 mm was examined for torsional rigidity at 260° and 280° C. with a rheometer mfd. by Rheometric. The rigidity in a high-temperature atmosphere serves as an indication of the deformation resistance during soldering. The rigidity retention at 280° C. was determined by assuming the torsional rigidity at 260° C. to be 1.0 and used as an indication of the reliability of the strength in a high-temperature state. It is favorable for the reliability that the rigidity retention be at least 0.5 or above.

6) Stability in melting

A resin was kept in a molding machine at a temperature higher than the melting point (flow-initiating temperature) of the resin by 10° C. for 30 minutes to observe the surface of the resulting molded article. A sample wherein an abnormal phenomenon such as blistering, buckling, cracking, discoloration or gas evolution was observed was shown by "X", while a case wherein no abnormal phenomenon was observed was shown by "○". A test piece made of the resin after being present in the molding machine in a molten state was examined for torsional rigidity at 280° C. according to the same method as that described in the paragraph (4) and the rigidity retention at this point of time was calculated by assuming the rigidity before the residence in the molding machine to be 1.0.

EXAMPLE 1

As shown in Table 1, 65 mole % of p-acetoxybenzoic acid, 2.5 mole % of 4,4'-diacetoxydiphenylpropane, 17.5 mole % of terephthalic acid, 15 mole % of 4,4'-diacetoxybiphenyl and 0.05 mole % (based on the total feed) of potassium acetate were fed into a reactor fitted with a stirrer, a nitrogen gas inlet tube and an outlet for distillate and heated to 260° C. in a nitrogen stream over a period of one hour. While distilling off formed acetic acid, the contents were kept at 260° to 300° C. for 2 hours, then at 300° to 320° C. for one hour and finally at 320° to 360° C. for one hour by heating and distillation in a vacuum to remove formed acetic acid. Nitrogen gas was introduced into the reactor to cool the contents to a room temperature. The obtained polymer exhibited optical anisotropy at about 340° C. or above as observed with a polarization microscope fitted with a hot stage. The polymer was examined for melting point, resistance to soldering heat, modulus of rigidity, stability in melting or rigidity retention according to the above-mentioned methods. The results are given in Table 1.

EXAMPLES 2 to 7

Polymers were each prepared in the same manner as that of Example 1 except that the monomers were used in a ratio as specified in Table 1 and that the final heating temperature was set so as to be not below the temperature range in which the obtained polymer can flow. The polymers thus prepared were examined in a similar manner to that of Example 1. The results are given in Table 1.

COMPARATIVE EXAMPLES 1 TO 4

Polymers were each prepared in the same manner as that of Example 1 except that the monomers listed in Table 1 were used in a ratio as specified in Table 1 and that the final heating temperature was set so as to be not below the temperature range in which the obtained polymer can flow. The polymers thus prepared were examined in a similar manner to that of Example 1. The results are given in Table 1.

All of the polymers prepared in Examples 2 to 7 and Comparative Examples 1 to 4 except that of Comparative Example 4 exhibited liquid crystallinity.

EXAMPLE 8

A composition comprising 100 parts by weight of the polymer prepared in Example 1 and 20 parts by weight of glass fiber was examined in a similar manner to that of Example 1. The results are given in Table 1.

TABLE 1

| | Monomer composition (mole %) | | | | | | Characteristics of polymer and composition | | | | | | | | |
|---|---|---|---|---|---|---|---|---|---|---|---|---|---|---|---|
| | (I) p-acetoxy benzoic acid | (II) 4,4'-diacetoxy-diphenyl | (III) CH₃COO—⟨ring⟩—X—⟨ring⟩—OCOCH₃ | | (IV) tere-phthalic acid | Other | m.p. (°C) | process-ability | torsional rigidity (kg/cm²) | | reten-tion | resis-tance to soldering heat | stability in melting | rigidity retention after the residence in a molten state | remark |
| | | | | | | | | | 260° C. | 280° C. | | | | | |
| Ex. 1 | 65 | 15 | X: —C(CH₃)₂— | | 2.5 | 17.5 | | 340 | ○ | 16,000 | 14,500 | 0.9 | ○ | ○ | 0.9 | |
| Ex. 2 | 62 | 15 | X: —C(CH₃)(phenyl)— | | 2.5 | 17.5 | | 335 | ○ | 15,500 | 12,900 | 0.8 | ○ | ○ | 0.9 | |
| Ex. 3 | 65 | 15 | X: —C(CH₃)₂— (with CH₃ groups on ring) | | 2.5 | 17.5 | | 330 | ○ | 18,500 | 16,200 | 0.9 | ○ | ○ | 0.8 | |
| Comp. Ex. 1 | 65 | 17.5 | — | | — | 17.5 | | 402 | × | 28,000 | 23,300 | 0.8 | ○ | ○ | 0.7 | |
| Comp. Ex. 2 | 65 | 6.5 | X: —C(CH₃)₂— | | 11 | 17. | | 268 | ○ | 1,200 | im-measur-able | — | × | × | — | |
| Comp. Ex. 3 | 40 | 27.5 | X: —C(CH₃)₂— | | 2.5 | 30 | | 320 | ○ | 21,000 | 8,500 | 0.4 | × | × | 0.6 | |
| Comp. Ex. 4 | 90 | 2.5 | X: —C(CH₃)₂— | | 2.5 | 5 | | 396 | × | — | — | — | — | — | — | no homogeneous polymer obtained |
| Ex. 4 | 60 | 17.5 | X: —C(CH₃)(phenyl)— | | 2.5 | 20 | | 330 | ○ | 15,500 | 14,000 | 0.9 | ○ | ○ | 0.8 | |

TABLE 1-continued

| | Monomer composition (mole %) | | | | | | Characteristics of polymer and composition | | | | | | |
|---|---|---|---|---|---|---|---|---|---|---|---|---|---|
| | (I) p-acetoxy benzoic acid | (II) 4,4'-diacetoxy-diphenyl | (III) CH$_3$COO—⟨⟩—X—⟨⟩—OCOCH$_3$ | (IV) tere-phthalic acid | Other | m.p. (°C.) | process-ability | torsional rigidity (kg/cm$^2$) 260° C. | 280° C. | reten-tion | resis-tance to soldering heat | stability in melting | rigidity retention after the residence in a molten state | remark |
| Ex. 5 | 80 | 7.5 | 2.5  X: —C(CH$_3$)(C$_6$H$_5$)— | 10 | | 350 | ○ | 17,200 | 13,700 | 0.8 | ○ | ○ | 0.8 | |
| Ex. 6 | 71 | 10.5 | 4  X: —C(CH$_3$)(C$_6$H$_5$)— | 14.5 | | 332 | ○ | 17,500 | 12,000 | 0.7 | ○ | ○ | 0.8 | |
| Ex. 7 | 65 | 16.5 | 1  X: —C(CH$_3$)(C$_6$H$_5$)— | 17.5 | | 361 | ○ | 17,700 | 15,900 | 0.9 | ○ | ○ | 1.0 | |
| Ex. 8 | 65 | 15 | 2.5  X: —C(CH$_3$)$_2$— | 17.5 | glass fiber*1 20 parts by wt. | 340 | ○ | 34,000 | 27,100 | 0.8 | ○ | ○ | 0.99 | |

*1 per 100 parts by weight of the polymer

We claim:

1. A polyester resin exhibiting anisotropy in a molten state combined with good heat resistance and melt-processability which consists essentially of constituent units represented by the following formulas (I), (II), (III) and (IV) with the proviso that the proportions of the units (I), (II), (III) and (IV) to the total constituent units are 50 to 85, 5 to 30, 0.1 to 5, and 5 to 30 mole percent, respectively where:

(I) is

(II) is $-O-Ar_2-O-$,
(III) is $-O-Ar_3-O-$, and
(IV) is

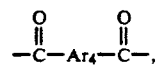

wherein $Ar_1$ is selected from the group consisting of a phenylene group, a naphthalene group, and a mixture of phenylene and naphthalene groups; $Ar_2$ is selected from the group consisting of a phenylene group, and a biphenylene group, and a mixture of phenylene and biphenylene groups; $Ar_3$ is

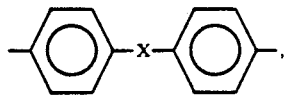

wherein X is selected from the group consisting of

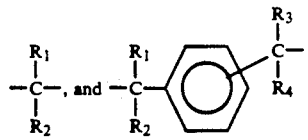

wherein $R_1$, $R_2$, $R_3$ and $R_4$ are each an individually selected alkyl group having 1 to 20 carbon atoms, or a phenyl group, and $Ar_4$ is selected from the group consisting of a phenylene group, a naphthalene group, and a mixture of phenylene and naphthalene groups.

2. A polyester resin exhibiting anisotropy in the molten state according to claim 1 which exhibits a melting point at a temperature of no more than 370° C.

3. A polyester resin exhibiting anisotropy in the molten state according to claim 1 wherein $R_1$, $R_2$, $R_3$ and $R_4$ are each an individually selected alkyl group having 1 to 5 carbon atoms.

4. A polyester resin exhibiting anisotropy in the molten state according to claim 1 wherein $R_1$, $R_2$, $R_3$ and $R_4$ are each an individually selected alkyl group having 1 to 3 carbon atoms.

5. A polyester resin exhibiting anisotropy in the molten state according to claim 1 wherein the molar ratio of constituent units (II)+(III) to constituent unit (IV) is 0.75 to 1.25:1.

6. A polyester resin exhibiting anisotropy in the molten state according to claim 1 wherein the molar ratio of constituent units (II)+(III) to constituent unit (IV) is 0.95 to 1.05:1.

7. A polyester resin exhibiting anisotropy in the molten state according to claim 1 which exhibits a melt viscosity of no more than $1 \times 10^6$ P. when measured at least 10° C. higher than the melting point while under a shear stress of 100 sec.$^{-1}$.

8. A polyester resin exhibiting anisotropy in the molten state according to claim 1 which exhibits a melt viscosity of no more than $1 \times 10^4$ P. when measured at least 10° C. higher than the melting point while under a shear stress of 100 sec.$^{-1}$.

9. A polyester resin exhibiting anisotropy in the molten state according to claim 1 wherein $Ar_1$ is a phenylene group.

10. A polyester resin exhibiting anisotropy in the molten state according to claim 9 wherein $Ar_1$ is a 1,4-phenylene group.

11. A polyester resin exhibiting anisotropy in the molten state according to claim 1 wherein $Ar_2$ is a biphenylene group.

12. A polyester resin exhibiting anisotropy in the molten state according to claim 1 wherein $Ar_2$ is a 4,4'-biphenylene group.

13. A polyester resin exhibiting anisotropy in the molten state according to claim 1 wherein $Ar_3$ is 2,2-propylidenebis(1,4-phenylene).

14. A polyester resin exhibiting anisotropy in the molten state according to claim 1 wherein X of $Ar_3$ is

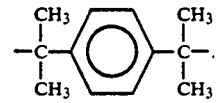

15. A polyester resin exhibiting anisotropy in the molten state according to claim 1 wherein $Ar_4$ is phenylene.

16. A polyester resin exhibiting anisotropy in the molten state according to claim 15 wherein $Ar_4$ is 1,4-phenylene.

17. A polyester resin exhibiting anisotropy in the molten state according to claim 1 wherein $Ar_1$ is selected from the group consisting of 1,4-phenylene, 2,6-naphthalene, and mixtures thereof; $Ar_2$ is selected from the group consisting of 1,4-phenylene, 4,4'-biphenylene, and mixtures thereof; and $Ar_4$ is selected from the group consisting of 1,4-phenylene, 2,6-naphthalene, and mixtures thereof.

18. A polyester resin exhibiting anisotropy in the molten state according to claim 17 wherein $Ar_1$ is 1,4-phenylene, $Ar_2$ is 4,4'-biphenylene, X of $Ar_3$ is $-C(CH_3)_2-$, and $Ar_4$ is 1,4-phenylene.

19. A polyester resin exhibiting anisotropy in the molten state according to claim 17 wherein $Ar_1$ is 1,4-phenylene, $Ar_2$ is 4,4'-biphenylene, X of $Ar_3$ is

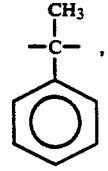

and $Ar_4$ is 1,4-phenylene.

20. A polyester resin exhibiting anisotropy in the molten state according to claim 1 which incorporates 1 to 80 percent by weight of an inorganic filler based upon the total weight of the resulting composition.

* * * * *